United States Patent
He

(10) Patent No.: US 12,413,499 B2
(45) Date of Patent: Sep. 9, 2025

(54) VERIFICATION SYSTEM FOR I2S BUS PROTOCOL

(71) Applicant: IPGoal Microelectronics (Sichuan) Co., Ltd., Sichuan (CN)

(72) Inventor: Qingsong He, Sichuan (CN)

(73) Assignee: IPGOAL MICROELECTRONICS (SICHUAN) CO., LTD., Chengdu (CN)

( * ) Notice: Subject to any disclaimer, the term of this patent is extended or adjusted under 35 U.S.C. 154(b) by 43 days.

(21) Appl. No.: 18/395,837

(22) Filed: Dec. 26, 2023

(65) Prior Publication Data

US 2024/0129224 A1    Apr. 18, 2024

(30) Foreign Application Priority Data

Jul. 31, 2023 (CN) .......................... 202310956327.5

(51) Int. Cl.
H04L 43/50 (2022.01)
G06F 13/42 (2006.01)
H04L 12/40 (2006.01)

(52) U.S. Cl.
CPC .......... *H04L 43/50* (2013.01); *G06F 13/4282* (2013.01); *H04L 12/40* (2013.01); *G06F 2213/0016* (2013.01)

(58) Field of Classification Search
CPC ... H04L 43/50; H04L 12/40; H04L 12/40013; H04L 41/145; H04L 41/0869; G06F 13/4282; G06F 2213/0016; G06F 13/40
See application file for complete search history.

(56) References Cited

U.S. PATENT DOCUMENTS

| | | | |
|---|---|---|---|
| 2009/0024235 A1 | 1/2009 | Kim | |
| 2023/0161397 A1* | 5/2023 | Zhou | H04W 4/80 713/323 |

FOREIGN PATENT DOCUMENTS

| | | |
|---|---|---|
| CN | 102346234 A | 2/2012 |
| CN | 112306932 A | 2/2021 |

* cited by examiner

*Primary Examiner* — David S Huang
(74) *Attorney, Agent, or Firm* — SHIMOKAJI IP

(57) ABSTRACT

A verification system for I2S bus protocol includes a receiving and converting unit, a configuration unit, a clock control unit, and a data conversion unit. The receiving and converting unit receives a control command sent by the UVM verification platform and converts into an execution command. The configuration unit configures system parameters. The clock control unit generates a clock signal with a corresponding time sequence according to the system parameters. The data conversion unit receives data information from the UVM verification platform and converts into a data type same with the DUT, or, receives data information from the device under test and converts into a data type same with the UVM verification platform. The present system can cover all device types applied to the I2S protocol standard, thereby quickly achieving the verification and monitoring data on the interface to realize the verification for I2S bus devices.

9 Claims, 1 Drawing Sheet

VERIFICATION SYSTEM FOR I2S BUS PROTOCOL

FIELD OF THE INVENTION

The invention relates to the technical field of protocol verification for communication bus, in particular to a verification system for I2S (Inter-IC Sound) bus protocol.

BACKGROUND OF THE INVENTION

An I2S (Inter-IC Sound) bus, as an audio data transmission standard, is widely used in audio devices. The existing technology for verifying the I2S bus protocol involves using FPGA (Field-Programmable Gate Array) or other fixed circuitry to simulate I2S devices and communicate with the device under test (DUT) to finally validate the communication results. However, the content of communication is generally limited by the circuitry.

The current verification for the I2S bus protocol uses FPGA or fixed I2S circuits to communicate with the DUT. However, such verification is not suitable for the diverse range of audio devices with I2S circuits in the consumer market. It is difficult to cover the various scenarios that may arise from different types of devices using the I2S bus. Moreover, this method lacks randomness in the validation process and requires a high cost and limited versatility to create a large number of I2S circuits. On the other hand, using FPGA to simulate the I2S devices for verification would be cumbersome and prone to errors due to the need for code replacement in different scenarios. Furthermore, relying on the fixed I2S circuits or FPGA simulation can only validate normal communication between the DUT and the I2S device, which lacks randomness testing, thus it's easy for validation engineers to overlook abnormal bus communications. These overlooked abnormal situations are unlikely to be found during normal testing but can have fatal consequences if they occur in the actual chip product.

By this token, it's difficult for the existing technical solutions to locate and identify specific faults when verifying a faulty DUT connected via the I2S bus, and the capability in fault correction is limited.

Therefore, it is necessary to provide an improved verification system for I2S bus to overcome the above defects.

SUMMARY OF THE INVENTION

The purpose of the present invention is to provide a verification system for I2S bus protocol. By configuring different system parameters, the verification system of the present invention can cover all device types applied to the I2S protocol standard, thereby quickly achieving the verification and monitoring all data on the interface to realize the verification of the I2S bus devices.

To achieve the above purpose, a verification system for I2S bus protocol based on a UVM (Universal Verification Methodology) verification platform includes a receiving and converting unit, a configuration unit, a clock control unit, and a data conversion unit. The receiving and converting unit is configured to receive a control command sent by the UVM verification platform and convert the control command into a different execution command that can be recognized and executed by other units. The configuration unit is adapted to configure system parameters based on the execution command sent by the receiving and converting unit, so that the system parameters comply with requirements of the UVM verification platform. The clock control unit is configured to open or close based on the execution command sent by the receiving and converting unit, and generate a clock signal with a corresponding time sequence according to the system parameters, by which the verification system communicates with the a device under test. The data conversion unit is configured to receive data information from the UVM verification platform through the receiving and converting unit, convert the data information into a data type same with the DUT, and send the data information to the device under test for verification; or, the data conversion unit is configured to receive data information from the device under test, convert the data information into a data type same with the UVM verification platform, and send the data information to the UVM verification platform for verification.

As a preferable embodiment, a pre-storing unit is further included and configured to pre-store the data information sent by the UVM verification platform through the receiving and converting unit and the data information sent by the device under test through the data conversion unit.

As a preferable embodiment, in the configuration unit, a communication role, a communication clock, a communication mode, a data transmission direction, and a valid data length of the verification system are configured based on specifications of an I2S communication protocol and the UVM verification platform.

As a preferable embodiment, the communication role of the system comprises a master and a slave, the communication mode comprises a half-duplex communication mode and a full-duplex communication mode, and the data transmission direction includes data input and data output.

As a preferable embodiment, in the configuration unit, a frequency and a time sequence of the communication clock are configured.

As a preferable embodiment, the data conversion unit is configured to convert data received from the receiving and converting unit into serial data and convert data received from the device under test into parallel data.

As a preferable embodiment, the data conversion unit is configured to compare a received data length with the valid data length set in the configuration unit, when the received data length is less than the valid data length, binary zero padding is performed on lower bits of the data received; when the received data length is greater than the valid data length, the lower bits of the data received are ignored.

As a preferable embodiment, the verification system further includes an interface unit which is provided with a bit clock signal line, a frame clock signal line, and two serial data lines, each line being in point-to-point connection with the device under test.

As a preferable embodiment, in the half-duplex communication mode, one of the two serial data lines is unconnected; in the full-duplex communication mode, the two serial data lines have opposite transmission direction.

In comparison with the prior arts, the verification system for I2S bus protocol in the present invention is a dedicated verification system for the I2S bus and based on the UVM verification platform. In the verification system for I2S bus protocol of the present invention, different system parameters are configured in the configuration unit, the communication between different I2S devices and the DUT through the bus interface is simulated, and all data on the interface is monitored, thereby verifying the completeness and correctness of the design function. Furthermore, with this verification system, verification engineers can flexibly change the attributes of the verification platform according to specific design specifications, thereby ensuring the integrity and efficiency of the verification process.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
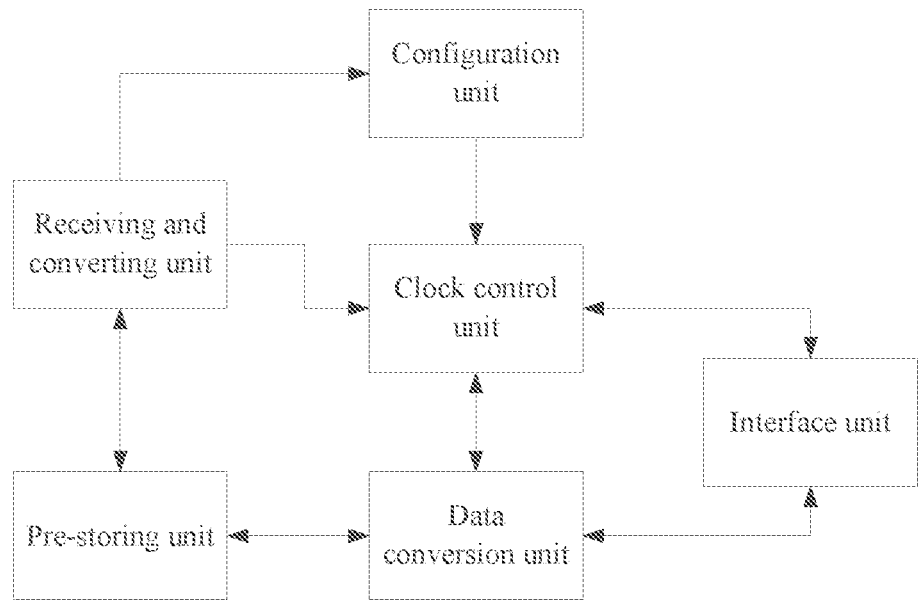
FIG. 1 is a schematic diagram of the verification system for I2S bus protocol according to an embodiment of the present invention.

Referring to the accompanying drawings, the embodiments of the present invention are described. Similar reference numerals in the drawings represent similar elements. As described above, the present invention provides a verification system for I2S bus protocol that can cover all device types specified in the I2S protocol standard by configuring different system parameters, thereby allowing the quick verification and monitoring all data on the interface, and achieving verification of I2S bus devices.

Referring to FIG. 1, which shows a schematic diagram of the verification system for I2S bus protocol of the present invention, the verification system for I2S bus protocol is based on a UVM verification platform and includes a receiving and converting unit, a configuration unit, a clock control unit, and a data conversion unit. The receiving and converting unit is configured to receive control commands from the UVM verification platform and convert the control commands into different execution commands that can be recognized and executed by other units. The configuration unit is adapted to configure system parameters based on the execution commands sent by the receiving and converting unit, so that the system parameters meet the requirements of the UVM verification platform, which allows different DUTs to be matched with the UVM verification platform after parameter configuration, and accordingly enables the UVM verification platform to perform verification operations on them. The clock control unit is configured to open or close based on the execution commands sent by the receiving and converting unit and generate a clock signal with a corresponding time sequence according to the system parameters configured by the configuration unit, by which the verification system for I2S bus protocol communicates with the DUT. The data conversion unit is configured to receive data information from the UVM verification platform through the receiving and converting unit, convert the data information into a data type same as the DUT, and send the data information to the DUT for verification. Alternatively, the data conversion unit is configured to receive data information from the DUT, convert the data information into a data type same as the UVM verification platform, and send the data information to the UVM verification platform for verification.

In one embodiment, the receiving and converting unit includes a UVM register adapter configured to translate high-level UVM commands into low-level register bus transactions.

The clock control unit includes a counter and a UVM event trigger. When each timing cycle of the operating system arrives, the counter will increase by 1. When the preset count (provided by the configuration unit) is reached, the counting stops and is reset to zero. Then, the UVM event trigger in the clock control unit that outputs this event to the receiving and converting unit. In such a way, BCLK and LRCK signals based on the configuration unit's output are generated.

The data conversion unit is a shift register, which can convert serial data to parallel data or parallel data to serial da a. When serial data is converted to parallel data, the signal line of the data is sampled at the rising edge of each clock cycle, and then the original data is shifted left by one position and the newly sampled data is placed at the least significant position. When converting parallel data to serial data, the falling edge of each clock cycle outputs the highest bit of the original data to the interface, and then shifts the data left by one bit until the data output is complete or the clock signal stops.

The configuration unit includes multi-bit registers and a reset controller. When the receiving and converting unit starts the verification, it will allocate initial values to each register in the configuration unit according to the verification plan. During the verification process, the counter threshold of the clock control unit will request the values of the registers from the configuration unit. After the reset controller resets, all register values are reset to zero, waiting for the next reassignment of the receiving and converting unit.

As a preferred embodiment of the present invention, as shown in FIG. 1, the verification system for I2S bus protocol further includes a pre-storing unit. The pre-storing unit is configured to pre-store the data information sent by the UVM verification platform through the receiving and converting unit and the data information sent by the DUT through the data conversion unit. In such a way, whether the data sent from the UVM verification platform to the DUT or the data sent from the DUT to the UVM verification platform, will be temporarily stored in the pre-storing unit until a sending command is received or the clock control unit generates a clock for sending data. Therefore, it's ensured that the data transmission between the verification system and the DUT is performed according to a set command and a time sequence, thereby ensuring the accuracy and timeliness of communication. In the present invention, different system parameters are configured in the configuration unit, and the data between the UVM verification platform and the DUT is converted by the data conversion unit, so that the normal communication between the DUT and the UVM verification platform is achieved, which enables the UVM verification platform to perform normal verifications on various DUTs and achieves the verifications for the I2S bus devices.

Figure 2:
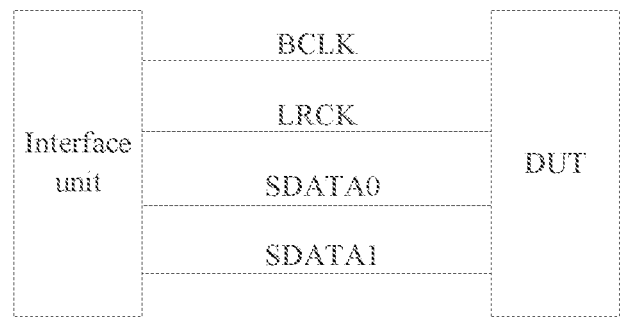
FIG. 2 a schematic diagram of the connection between the interface unit of the verification system for I2S bus protocol and the DUT according to an embodiment of the present invention.

Referring to FIG. 2, the verification system for I2S bus protocol of the present invention further includes an interface unit. The interface unit is provided with a bit clock signal line (BCLK), a frame clock signal line (LRCK), and two serial data lines (SDATA1, SDATA0), each line is in point-to-point connection with the DUT. Specifically, the two serial data lines are mainly used for different transmission modes, which have different connection methods.

The interface unit is essentially registers. When the output of the UVM event trigger from the clock control unit is received, the signal value of BCLK or LRCK is flipped by taking advantage of the characteristics of the registers, and the clock signal BCLK or LRCK can be identified at the receiving end.

Specifically, in the pre-storing unit, the pre-storing process of the data includes pre-sending and pre-receiving.

Specifically, in the pre-sending process, when the receiving and converting unit outputs an execution command of "start transmission", the data in the pre-storing unit is read and converted by the data conversion unit. After that, the pre-storing unit is cleared. Then, on the first falling edge of the bit clock signal line (BCLK), the most significant bit of the data is sent to the serial data line (SDATA0/1), and the remaining bits are sent according to the clock order. In the pre-receiving process, when the receiving and converting unit determines that the current data communication is completed, the pre-stored data is read by the receiving and converting unit, and then the pre-storing unit is cleared.

Specifically, in the configuration unit, the communication role, the communication clock, the communication mode, the data transmission direction, and the data valid length of the verification system are configured based on the specifications of the I2S communication protocol and the UVM verification platform, so that the parameters comply with the specifications of the I2S communication protocol and the UVM verification platform, thereby allowing the normal communication between the DUT and the UVM verification platform. Specifically, the communication role of the verification system includes a master and a slave. When the master is configured as the communication role, the clock control unit sends bit clock signals and frame clock signals with the specified clock frequency. When the slave is configured as the communication role, the clock control unit monitors the bit clock signals and the frame clock signals. The communication mode includes a half-duplex communication mode and a full-duplex communication mode, where the connection between the interface unit of the present invention and the DUT are different depending on the communication mode. Specifically, in the half-duplex communication mode, the serial data line (SDATA1) is unconnected, and only the serial data line (SDATA0) is connected to the DUT. In the full-duplex communication mode, the transmission directions of the two serial data lines (SDATA1, SDATA0) are opposite. The data transmission direction may include data input and data output. For the direction of data output, the data conversion unit obtains data from the receiving and converting unit (from the UVM verification platform) and outputs it to the DUT. For the direction of data input, the data conversion unit obtains data from the DUT and outputs it to the UVM verification platform through the pre-storing unit. In addition, in the configuration unit, the frequency and the time sequence of the communication clock are configured, so that the frequency and the time sequence of the communication clock of the verification system match with the DUT, thereby enabling communication between the verification system and the DUT at the same clock frequency.

In the present invention, the data conversion unit is configured to convert the data from the receiving and converting unit into serial data and convert the data from the DUT into parallel data. In the present invention, the data outputted by the UVM verification platform is parallel data, while the data outputted by the DUT is serial data. To enable normal communication therebetween, it is necessary to convert the data outputted by each party into a form that the other party can recognize and transmit. Specifically, the data conversion unit compares the received data length with the valid data length configured in the configuration unit. If the received data length is smaller than the valid data length, binary zero padding is performed on lower bits of the data received. For example, if the received data length from the data conversion unit is 1, and the valid data length configured in the configuration unit is n, then binary zero padding is performed on the n−1 lower bits of the data received (starting from the least significant bit). If the received data length from the data conversion unit is greater than the valid data length configured in the configuration unit, the lower bits of the received data are ignored. For example, if the received data length from the data conversion unit is i, and the valid data length configured in the configuration unit is j, the j−i lower bits of the received data are ignored (starting from the least significant bit). In such a way, it's ensured that the received data length is consistent with the valid data length that is configured in advance, thereby ensuring effective data transmission based on the configured parameters.

The working process of the verification system for I2S bus protocol is described in conjunction with FIG. 1 and FIG. 2 as follows.

First, the UVM verification platform sends a command of "parameter configuration" to the verification system based on the attributes of the DUT (e.g., the DUT acts as a slave, has a data bit width of 16 bits and a sound sampling frequency of 44.1 kHz, and only supports half-duplex communication). Upon receiving the command, the receiving and converting unit instructs the configuration unit to configure the communication role as a master, the valid data length as 16, the clock frequency as 1411200 (44100*16*2), the data transmission direction as data output, and the communication mode as half-duplex communication. The UVM verification platform sends a command of "send data 0x1ABC" to the verification system. Upon receiving the command, the receiving and converting unit inputs the data 0x1ABC into the pre-store unit and sends a command of "start transmission" to the clock control unit and the data conversion unit. Upon receiving the command of "start transmission", the clock control unit reads the parameters from the configuration unit, then pulls down the bit clock signal line (BCLK) and the frame clock signal line (LRCK), and generates a clock of the bit clock signal line (BCLK) based on the clock frequency in the configuration parameters. At the same time, the data conversion unit receives the command "start transmission", reads the pre-stored data 0x1ABC from the pre-store unit, clears the pre-stored data, and then converts the data into binary form (0001101010111100). Starting from the first falling edge of the bit clock signal line (BCLK), the data conversion unit outputs the most significant bit of the binary data to the serial data line (SDATA0) at each falling edge of the bit clock signal line (BCLK). When the clock control unit detects that the data output has reached the valid length of 16, the level of the frame clock signal line (LRCK) is toggled, the clock at the bit clock signal line (BCLK) is paused, and the data conversion unit is configured to wait for a next command of "start transmission" from the receiving and converting unit. If the communication needs to be continued, the receiving and converting unit inputs new data into the pre-store unit and sends a command "start transmission" for repeating the above process. If the communication is not needed, a command of "stop transmission" is sent, and upon receiving the command "stop transmission", the clock control unit and the data conversion unit are reset to the initial states.

Second, the UVM verification platform sends a command of "parameter configuration" to the verification system based on the attributes of the DUT (e.g., the DUT acts as a slave, has a data bit width of 8 bits and a sound sampling frequency of 48 kHz, and only supports half-duplex communication). Upon receiving the command, the receiving and converting unit instructs the configuration unit to configure the communication role as a master, the valid data length as 16, the clock frequency as 768000 (48000*8*2), the data transmission direction as data input, and the communication mode as half-duplex communication. The UVM verification platform sends a command of "receive data" to the verification system. Upon receiving the command, the receiving and converting unit sends a command of "start transmission" to the clock control unit and the data conversion unit. Upon receiving the command of "start transmission", the clock control unit reads the parameters from the configuration unit, then pulls down the bit clock signal line (BCLK) and the frame clock signal line (LRCK), and generates a clock of the bit clock signal line (BCLK) based on the clock frequency in the configuration parameters. At the same time, the data conversion unit receives the command "start transmission", starts capturing the level of the serial data line (SDATA0) at the second rising edge of the bit clock signal line (BCLK), and then converts the captured data (binary number 01011010) output from the DUT into hexadecimal form (0x5A). Since the received data length of 8 is smaller than the valid data length of 16, the data conversion unit continues to pad zeros in the 8 lower bits of the data during the subsequent rising edges of the bit clock signal line (BCLK). The final hexadecimal data is 0x5A00, which is stored in the pre-store unit as the pre-received data. When the clock control unit detects that the data received has reached the valid data length of 16, the level of the frame clock signal line (LRCK) is toggled, the clock at the bit clock signal line (BCLK) is paused, and the data conversion unit is configured to wait for a next command of "start transmission" from the receiving and converting unit. The receiving and converting unit reads the pre-received data 0x5A00 from the pre-store unit, clears the pre-store unit, and feeds the data back to the UVM verification platform for data validation and correctness. If the communication needs to be continued, the receiving and converting unit sends a command "start transmission" for repeating the above process. If the communication is not needed, a command of "stop transmission" is sent, and upon receiving the command "stop transmission", the clock control unit and the data conversion unit are reset to the initial states.

In summary, the verification system for I2S bus protocol in the present invention is a dedicated verification system for the I2S bus and based on the UVM verification platform. In the verification system for I2S bus protocol of the present invention, different system parameters are configured in the configuration unit, the communication between different I2S devices and the DUT through the bus interface is simulated, and all data on the interface is monitored, thereby verifying the completeness and correctness of the design function. Furthermore, with this verification system, verification engineers can flexibly change the attributes of the verification platform according to specific design specifications, thereby ensuring the integrity and efficiency of the verification process.

The above-mentioned embodiments only represent several embodiments of the present invention, and the descriptions thereof are relatively specific and detailed, but should not be construed as limiting the scope of the patent invention. It should be pointed out that for those skilled in the art, several modifications and improvements can be made without departing from the concept of the present invention, which all belong to the protection scope of the present invention. Therefore, the scope of protection of the patent of the present invention shall be subject to the appended claims.

What is claimed is:

1. A verification system for Inter-IC Sound (I2S) bus protocol, based on a universal verification methodology (UVM) verification platform, comprising a receiving and converting unit, a configuration unit, a clock control unit, and a data conversion unit;
wherein the receiving and converting unit is configured to receive a control command sent by the UVM verification platform and convert the control command into a different execution command that can be recognized and executed by other units;
the configuration unit is adapted to configure system parameters based on the execution command sent by the receiving and converting unit, so that the system parameters comply with requirements of the UVM verification platform;
the clock control unit is configured to open or close based on the execution command sent by the receiving and converting unit, and generate a clock signal with a corresponding time sequence according to the system parameters, by which the verification system communicates with the a device under test (DUT);
the data conversion unit is configured to receive data information from the UVM verification platform through the receiving and converting unit, convert the data information into a data type same with the DUT, and send the data information to the device under test for verification; or, the data conversion unit is configured to receive data information from the device under test, convert the data information into a data type same with the UVM verification platform, and send the data information to the UVM verification platform for verification.

2. The verification system for I2S bus protocol according to claim 1, further comprising a pre-storing unit configured to pre-store the data information sent by the UVM verification platform through the receiving and converting unit and the data information sent by the device under test through the data conversion unit.

3. The verification system for I2S bus protocol according to claim 1, wherein in the configuration unit, a communication role, a communication clock, a communication mode, a data transmission direction, and a valid data length of the verification system are configured based on specifications of an I2S communication protocol and the UVM verification platform.

4. The verification system for I2S bus protocol according to claim 3, wherein the communication role of the system comprises a master and a slave, the communication mode comprises a half-duplex communication mode and a full-duplex communication mode, and the data transmission direction includes data input and data output.

5. The verification system for I2S bus protocol according to claim 3, wherein in the configuration unit, a frequency and a time sequence of the communication clock are configured.

6. The verification system for I2S bus protocol according to claim 1, wherein the data conversion unit is configured to convert data received from the receiving and converting unit into serial data and convert data received from the device under test into parallel data.

7. The verification system for I2S bus protocol according to claim 6, wherein the data conversion unit is configured to compare a received data length with the valid data length set in the configuration unit, when the received data length is less than the valid data length, binary zero padding is performed on lower bits of the data received; when the received data length is greater than the valid data length, the lower bits of the data received are ignored.

8. The verification system for I2S bus protocol according to claim 4, further comprising an interface unit which is provided with a bit clock signal line, a frame clock signal line, and two serial data lines, each line being in point-to-point connection with the device under test.

9. The verification system for I2S bus protocol according to claim 8, wherein in the half-duplex communication mode, one of the two serial data lines is unconnected; in the full-duplex communication mode, the two serial data lines have opposite transmission direction.

* * * * *